United States Patent
McIntosh

(10) Patent No.: US 9,168,621 B2
(45) Date of Patent: Oct. 27, 2015

(54) PIN CLAMP WITH MULTI-THICKNESS CLAMPING FEATURE

(71) Applicant: Bruce D. McIntosh, Princeton, IN (US)

(72) Inventor: Bruce D. McIntosh, Princeton, IN (US)

(73) Assignee: PHD, Inc., Fort Wayne, IN (US)

( * ) Notice: Subject to any disclaimer, the term of this patent is extended or adjusted under 35 U.S.C. 154(b) by 295 days.

(21) Appl. No.: 13/653,803

(22) Filed: Oct. 17, 2012

(65) Prior Publication Data

US 2014/0103589 A1 Apr. 17, 2014

Related U.S. Application Data

(60) Provisional application No. 61/548,448, filed on Oct. 18, 2011.

(51) Int. Cl.
*B23Q 3/08* (2006.01)
*B25B 5/08* (2006.01)

(52) U.S. Cl.
CPC .. *B23Q 3/08* (2013.01); *B25B 5/087* (2013.01)

(58) Field of Classification Search
USPC ...... 269/309, 310, 24, 27, 28, 228, 289 R, 32
See application file for complete search history.

(56) References Cited

U.S. PATENT DOCUMENTS

| 7,182,326 B2 | 2/2007 | McIntosh et al. |
| 7,448,607 B2 | 11/2008 | Steele et al. |
| 7,467,788 B2 | 12/2008 | McIntosh et al. |
| 7,516,948 B2 | 4/2009 | McIntosh et al. |
| 7,815,176 B2 | 10/2010 | McIntosh et al. |
| 2006/0049565 A1* | 3/2006 | Petit et al. ................ 269/32 |

\* cited by examiner

*Primary Examiner* — Lee D Wilson
*Assistant Examiner* — Nirvana Deonauth
(74) *Attorney, Agent, or Firm* — Taylor IP, P.C.

(57) ABSTRACT

A pin clamp for clamping a workpiece includes a housing and a locating pin extending through the housing and having a longitudinal axis. The locating pin is sized to be positioned within an opening of the workpiece. A finger is positioned adjacent to the locating pin and movable in a transverse direction relative to the longitudinal axis to retain the workpiece on the locating pin. A linear actuator is configured to move the locating pin in opposite directions along the longitudinal axis. A locking arrangement is carried by the housing. A sequence cam is connected with the linear actuator in a manner allowing axial movement of the linear actuator to be converted into transverse movement of the sequence cam. The sequence cam includes an engagement surface which engages the locking arrangement to lock the locating pin and the finger against the workpiece upon retraction of the linear actuator.

10 Claims, 17 Drawing Sheets

PIN CLAMP WITH MULTI-THICKNESS CLAMPING FEATURE

CROSS REFERENCE TO RELATED APPLICATIONS

This is a non-provisional application based upon U.S. provisional patent application Ser. No. 61/548,448, entitled "PIN CLAMP WITH MULTI-THICKNESS CLAMPING FEATURE", filed Oct. 18, 2011, which is incorporated herein by reference.

BACKGROUND OF THE INVENTION

1. Field of the Invention

The present invention relates to pin clamp assemblies.

2. Description of the Related Art

Pin clamps are typically used for gripping onto sheets of metal, often on automobile assembly lines so some process can be performed on that sheet metal. The pin clamp includes a locating pin that is extendable through a hole in the sheet metal. A finger extends from the locating pin which then retracts so the finger clamps down onto the sheet. Examples of pin clamps can be found in U.S. Pat. Nos. 7,182,326, 7,516,948, 7,448,607, 7,815,176, and 7,467,788.

In today's automobile manufacturing environment, however, some automobiles may be manufactured in multiple configurations. For example, an automobile may be manufactured in a first configuration that employs an internal combustion engine. That same automobile may also be offered in a second configuration that employs a battery powered motor. In these instances, it might be necessary for that automobile to have a different frame depending on whether it is gas or electric powered. An electric powered automobile requires a stronger frame to hold the substantial weight of the batteries needed to power it. A different size frame may require a thicker metal. Because it is the same vehicle, however, it otherwise uses many of the same parts. This makes it desirable to use the same assembly line for both versions, if possible.

Conventional pin clamps are adjusted to clamp down on workpieces of varied thicknesses. This is particularly the case for clamps having a hold mechanism that still clamp down on a workpiece even under power loss (such as pressurized air). These clamps need adjustment to accommodate this different thickness. Making such adjustments adds time and expense to the manufacturing process.

SUMMARY OF THE INVENTION

The present invention provides a pin clamp that can hold a car part of a first thickness, release the clamp from its power supply while it still holds onto the part, process the part, reattach the power supply to the clamp to release the part, and then start the process again but clamping onto another part having a second thickness. This allows the part to be processed anywhere along the assembly line without the clamp having to be constantly connected to a power source. It also no longer requires any readjustment of the pin clamp between removing the workpiece of first thickness and replacing it with a workpiece of second thickness.

The pin clamp of the present invention includes an internal lock that compensates for, illustratively, up to about 1.5 millimeters of variation in material thickness. A lock holds the finger firm against the various material thicknesses. This means that panels of different thicknesses can be held by the clamp and all will be held firmly with no play.

The invention in one form is directed to a pin clamp for clamping a workpiece, including a housing and a locating pin extending through the housing and having a longitudinal axis. The locating pin is sized to be positioned within an opening of the workpiece. A finger is positioned adjacent to the locating pin and movable in a transverse direction relative to the longitudinal axis to retain the workpiece on the locating pin. A linear actuator is configured to move the locating pin in opposite directions along the longitudinal axis. A locking arrangement is carried by the housing. A sequence cam is connected with the linear actuator in a manner allowing axial movement of the linear actuator to be converted into transverse movement of the sequence cam. The sequence cam includes an engagement surface which engages the locking arrangement to lock the locating pin and the finger against the workpiece upon retraction of the linear actuator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
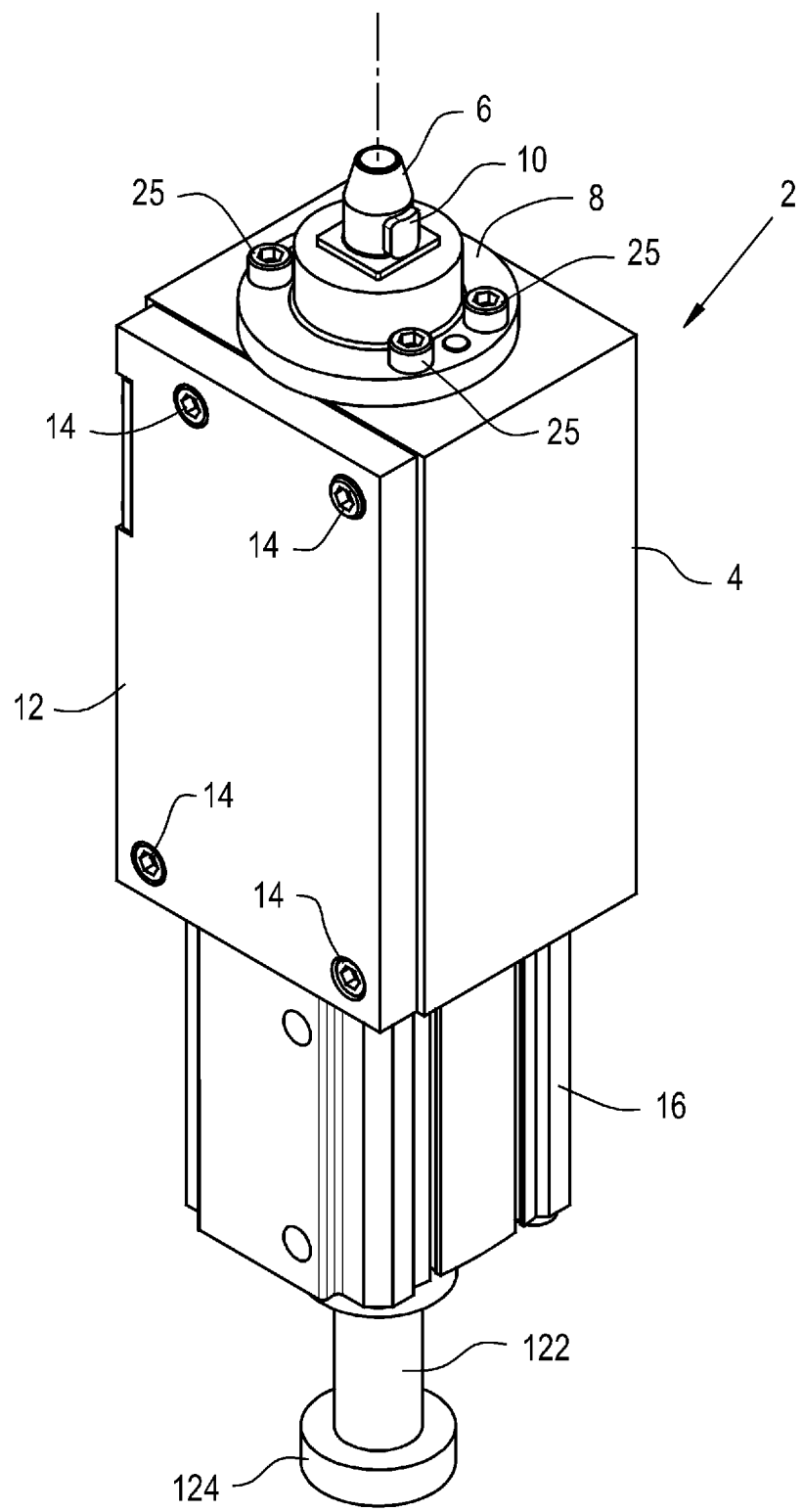
FIG. 1 is a perspective view of an embodiment of a pin clamp of the present invention.

Referring now to the drawings, and more particularly to FIG. 1, there is shown a pin clamp 2 which includes a housing 4 with a locating pin 6 extending therefrom. A collar 8 illustratively surrounds locating pin 6. A finger 10 is selectively radially extendable from and retractable into the locating pin. A cover 12 attaches to housing 4 via fasteners 14. This allows access to the internal components of clamp 2 as needed. A linear actuator in the form of a pneumatic actuator 16 extends from housing 4 illustratively opposite locating pin 6. A portion of piston rod 122 partially extends from actuator 16 and includes a nut 124 illustratively attached to the end thereof. Fasteners 25 illustratively attach collar 8 to housing 4.

Figure 2:
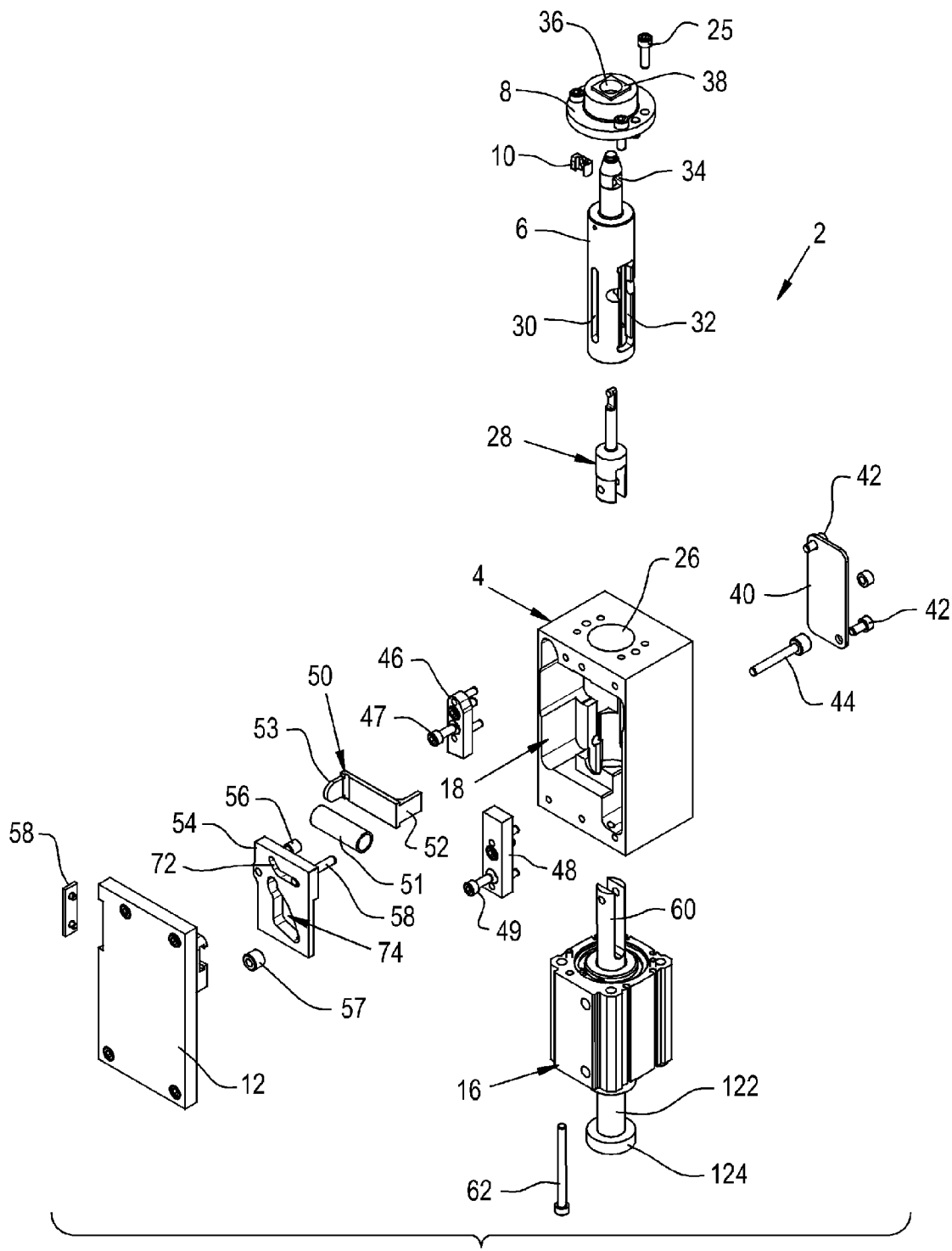
FIG. 2 is an exploded perspective view of the pin clamp shown in FIG. 1.

An exploded view of pin clamp 2 is shown in FIG. 2. This view depicts housing 4 with a cavity 18 formed therein to receive components of pin clamp 2 as further discussed. An opening 26 in housing 4 is configured to receive locating pin 6.

Illustratively, locating pin 6 is hollow so it may receive drive rod 28. It also includes slots 30 and 32 along with an opening 34 configured to receive finger 10. Collar 8 is shown with opening 36 configured to receive a portion of locating pin 6. A ledge 38 may serve as a base surface for a workpiece in the form of a piece of sheet metal or other material that is intended to be clamped down by finger 10.

Fasteners 25 attach collar 8 to housing 4. A cover plate 40 attaches to housing 4 via fasteners 42 in order to illustratively cover one side of cavity 18 opposite cover 12. Rod 44 extends though locating pin 6 and supports cam roller 57 that travels along the internal cam surface of cam slot 74 as described further herein. A lock bracket 46 fits into cavity 18 using fastener 47. Similarly, sequence bracket 48 fits into cavity 18 as well and attaches thereto via fastener 49. A Z-bracket 50 with tabs 52 and 53, and spring 51 are also located within cavity 18. A sequence cam 54, a roller 56 and a post 58 are also directed inwardly of cavity 18. Actuator 16 includes a piston rod 60 extending from one end and configured to couple to sequence cam 54 via rod 44. In this illustrative embodiment, piston rod 60 is "U" shaped to accommodate sequence cam 54. (See, also, FIG. 17b.) Rod 122 extends from the other end of actuator 16. Fasteners 62 attach actuator 16 to housing 4.

In the illustrated embodiment, cam roller 57 defines a cam follower that is positioned within and engages the internal cam surface of slot 74. However, it is possible to use a different type of cam follower. For example, rod 44 could itself define a cam follower which rides within the cam surface of slot 74.

As previously discussed, pin clamp 2 is configured to first, clamp onto a material of first thickness under fluid power (such as pressurized air), then have that power disconnected, still securely hold the material as it moves down the assembly line, and then reattach fluid power to release the material. Then, that same pin clamp, without any further adjustment or modification, is able to clamp down onto a material of a second thickness under subsequent fluid power and repeat the process again. In other words, the pin clamp may hold pieces of sheet metal or other workpieces of a variety of thicknesses and hold those workpieces under power loss without any modification to the pin clamp.

In alternative embodiments the power may be electrical or hydraulic.

Figure 3:
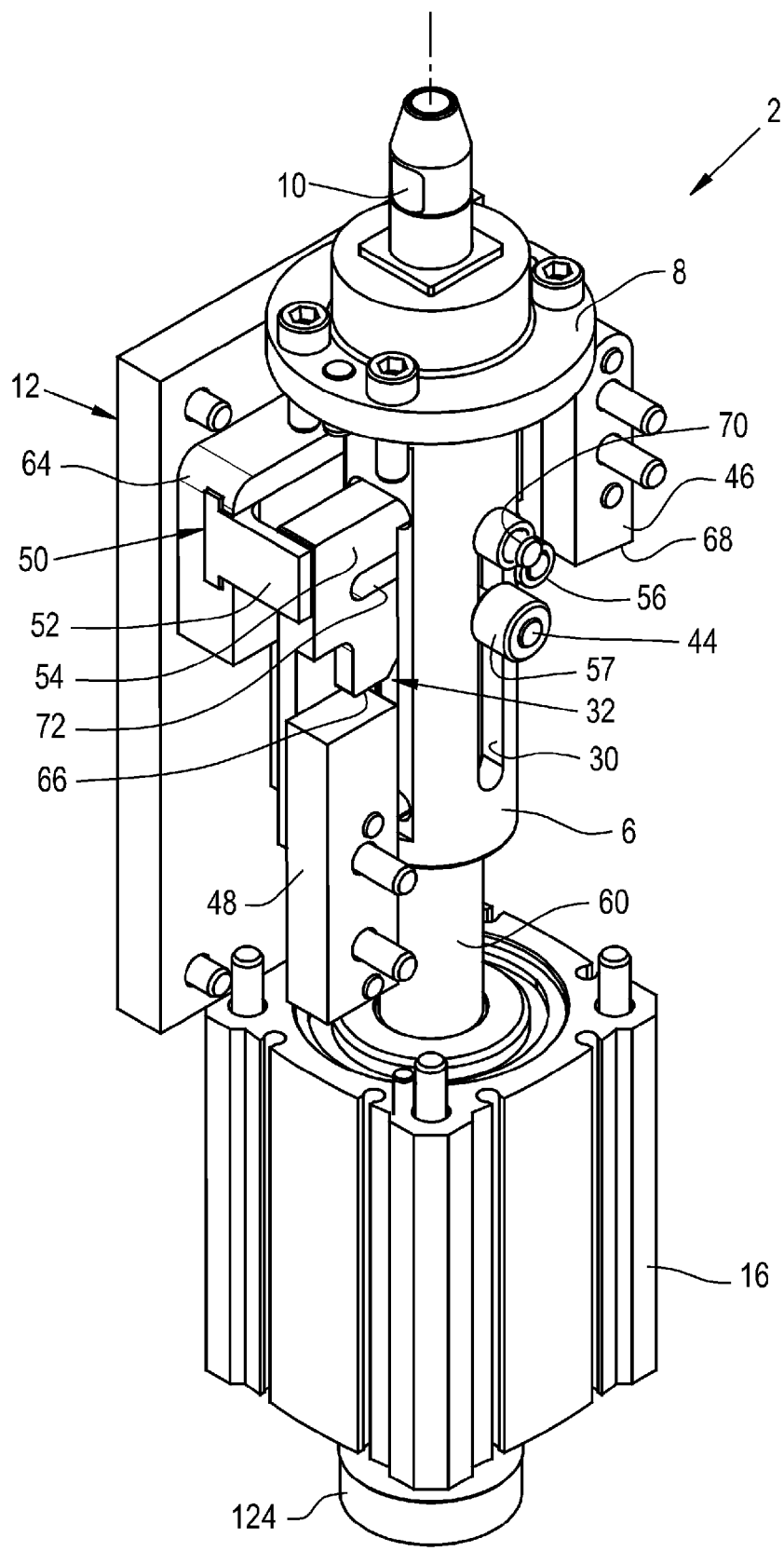
FIG. 3 is another perspective view of the pin clamp shown in FIGS. 1 and 2, with part of the housing removed.

A perspective isolated view of several of the internal components of pin clamp 2 is shown in FIG. 3. This view depicts the relative positioning of several of the components that help keep the pin clamp locked down onto a workpiece of particular thickness when no fluid pressure is being applied to finger 10. As shown herein, cover 12 includes a spring bracket 64 configured to hold Z-bracket 50 and a spring 51. Tab 52 is configured to push sequence cam 54. Sequence cam 54 extends through slot 32 through locating pin 6. Rod 44 and dowel 70 are disposed through slot 30. Located on opposite sides of locating pin 6 is lock bracket 46 and sequence bracket 48. Ledge 66 of sequence cam 54 rides along the illustrative top surface of sequence bracket 48 while roller 56 is configured to engage angled surface 68 of lock bracket 46. Roller 56 defines an engagement surface which locks with angled surface 68. Angled surface 68 is positioned at an angle of between 0° to 10°, relative to a direction of movement of sequence cam 54, and may be a flat surface or have a curved or differently shaped surface.

Figures 4A, 4B:
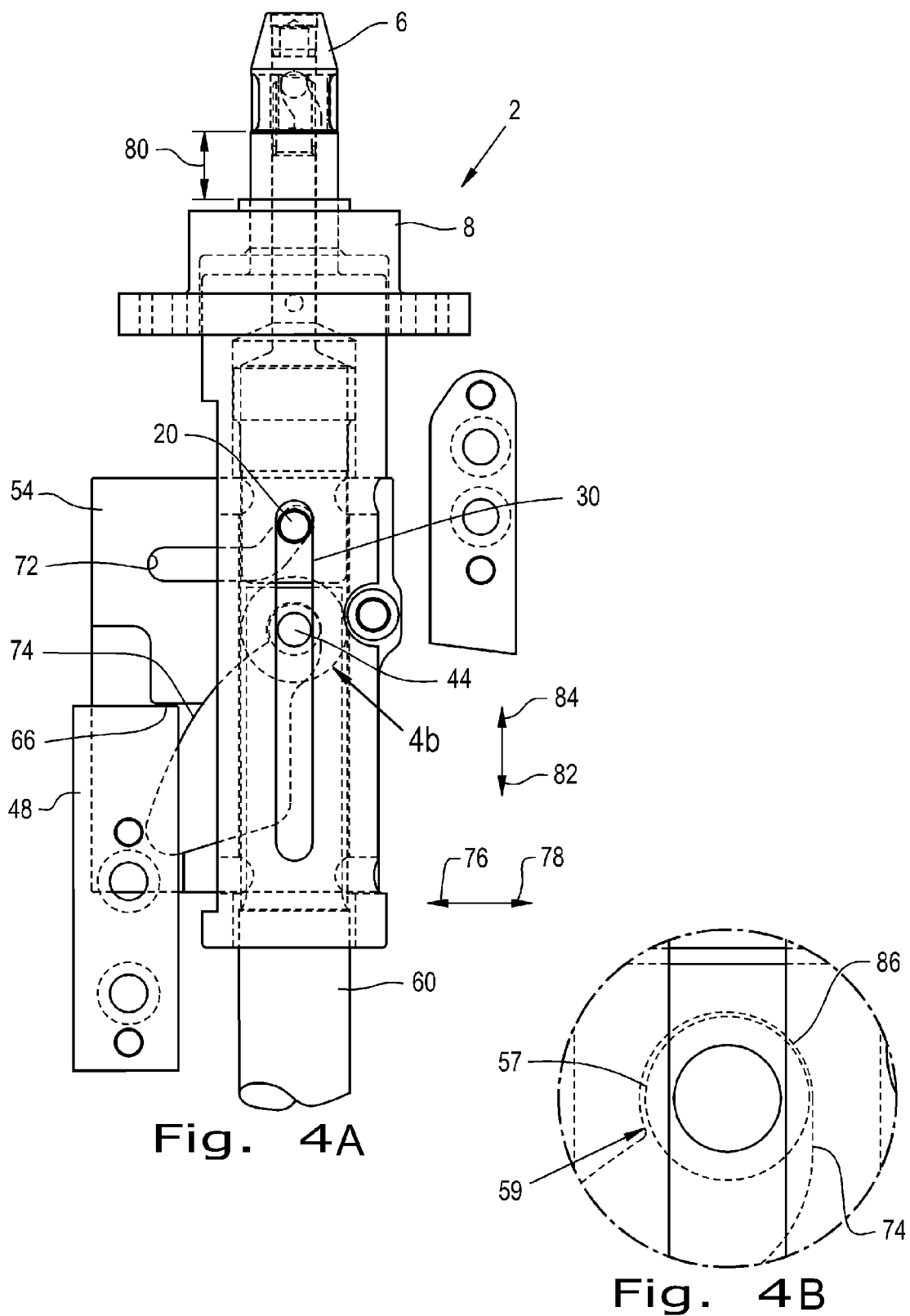
FIGS. 4A and 4B are side and end views, respectively of the pin clamp shown in FIGS. 1-3.

FIG. 3 also shows how piston rod 60 extends up through locating pin 6. The U-shaped channel in piston rod 60 is illustratively configured to allow sequence cam 54 to pass in between without interference. Drive rod dowel 70 also extends through slot 30 and is disposed in cam slot 72 of sequence cam 54. It will be appreciated as further discussed herein that dowel 70 also connects sequence cam 54 with drive rod 28 so that the path of cam slot 72 dictates the corresponding movement of drive rod 28 which in turn dictates the extension or retraction of finger 10. Rod 44 connects piston rod 60 with sequence cam 54 via slot 74 for moving the same in directions 76 and 78. (See, also, FIG. 4.)

Progression views depicting how pin clamp 2 operates to clamp down and lock onto a workpiece is shown in progression views of FIGS. 4-7. As shown in FIG. 4a, locating pin 6 is illustratively positioned a distance 80 above collar 8. In this illustrative embodiment, distance 80 may be 12.5 millimeters, for example. It is appreciated, however, that this distance is illustrative and such distance can be modified as desired. At this point, ledge 66 of sequence cam 54 is sitting on top of lock bracket 48. It is contemplated that movement of piston rod 60 from actuator 16 in direction 82 will begin moving sequence cam 54 in direction 78. As shown in FIG. 4b, the upper position of slot 74 includes a locking position 86 that prevents roller 57 from moving if there is an air pressure loss. Also included is detent 59 which helps prevent piston rod 60 from dropping out of locking position 86 under a loss of fluid power. Illustratively, sequence cam 54 receives a bias force in direction 78 from bracket 50. This keeps detent 59 pushing against roller 57 regardless of whether air pressure is being applied to piston rod 60. If air pressure is lost, detent 59 of sequence cam 54 is still pushing against roller 57 preventing it from dislodging from locking position 86.

Figure 5:
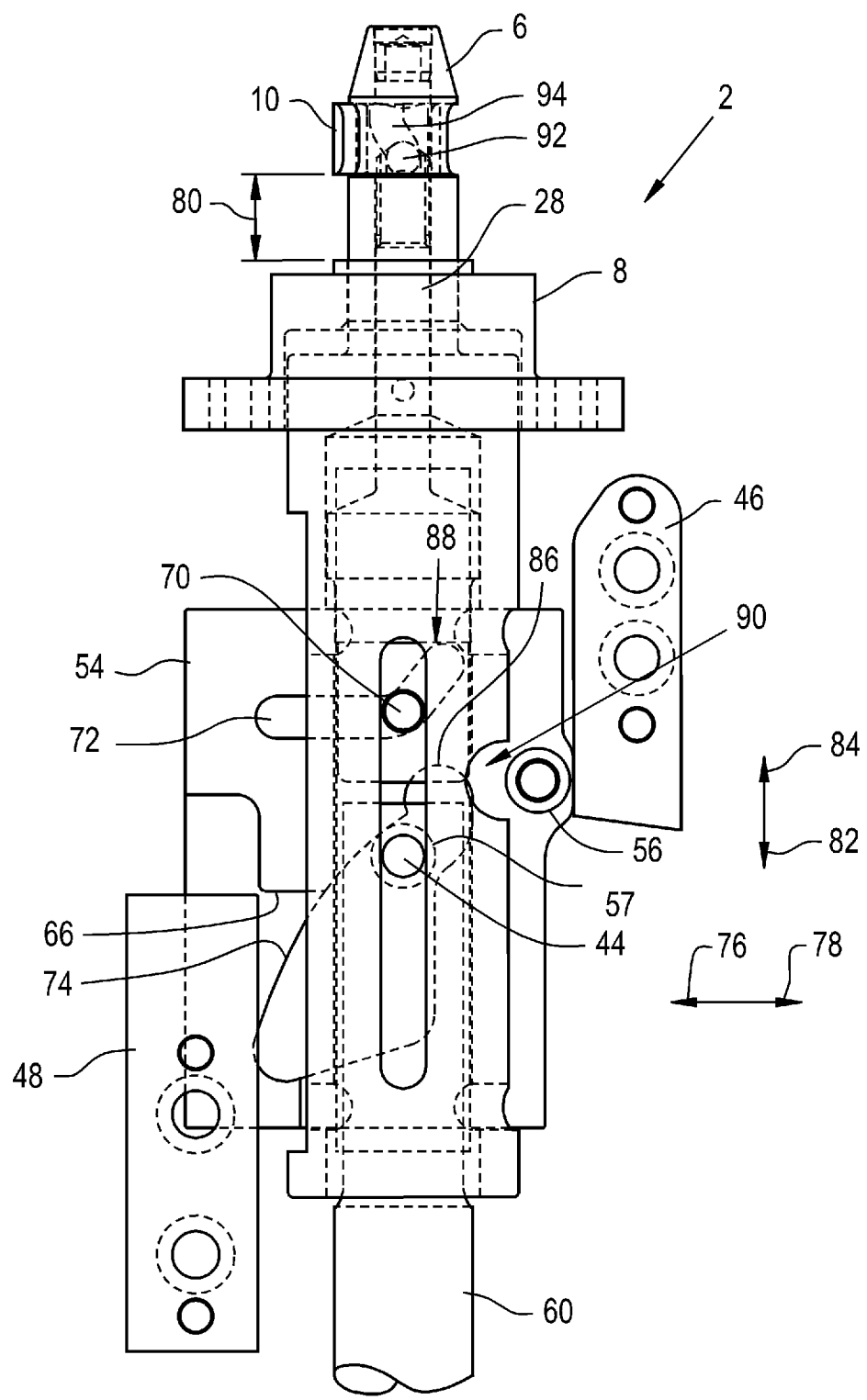
FIGS. 5, 6, 7A, 7B and 8-12 are side views illustrating a sequence of operation of the pin clamp of the present invention.

The view in FIG. 5 depicts the consequence of piston rod 60 moving downward in direction 82. As this happens, roller 57 pulls out of locking position 86 and is pulled downward in cam slot 74. At this point, slot 74 maintains itself out of the way so roller 57 can lower. At the same time, angled section 88 of cam slot 72 causes dowel rod 70 to not only lower but push sequence cam 54 in direction 78. When this happens, a sufficient extent, as that shown in FIG. 5, ledge 66 of sequence cam 54 is no longer engaged by sequence bracket 48. As this all happens, roller 56 moves out from cavity 90 and approaches lock bracket 46. Also, cam follower 92 of drive rod 28 moves in direction 82. Following cam slot 94, cam follower 92 pushes finger 10 in direction 76 extending it from locating pin 6. It is appreciated, however, the configuration and size of cam slot 94 can be modified to create the desired movement of finger 10 upon response to the drive rod's movement.

Figure 6:
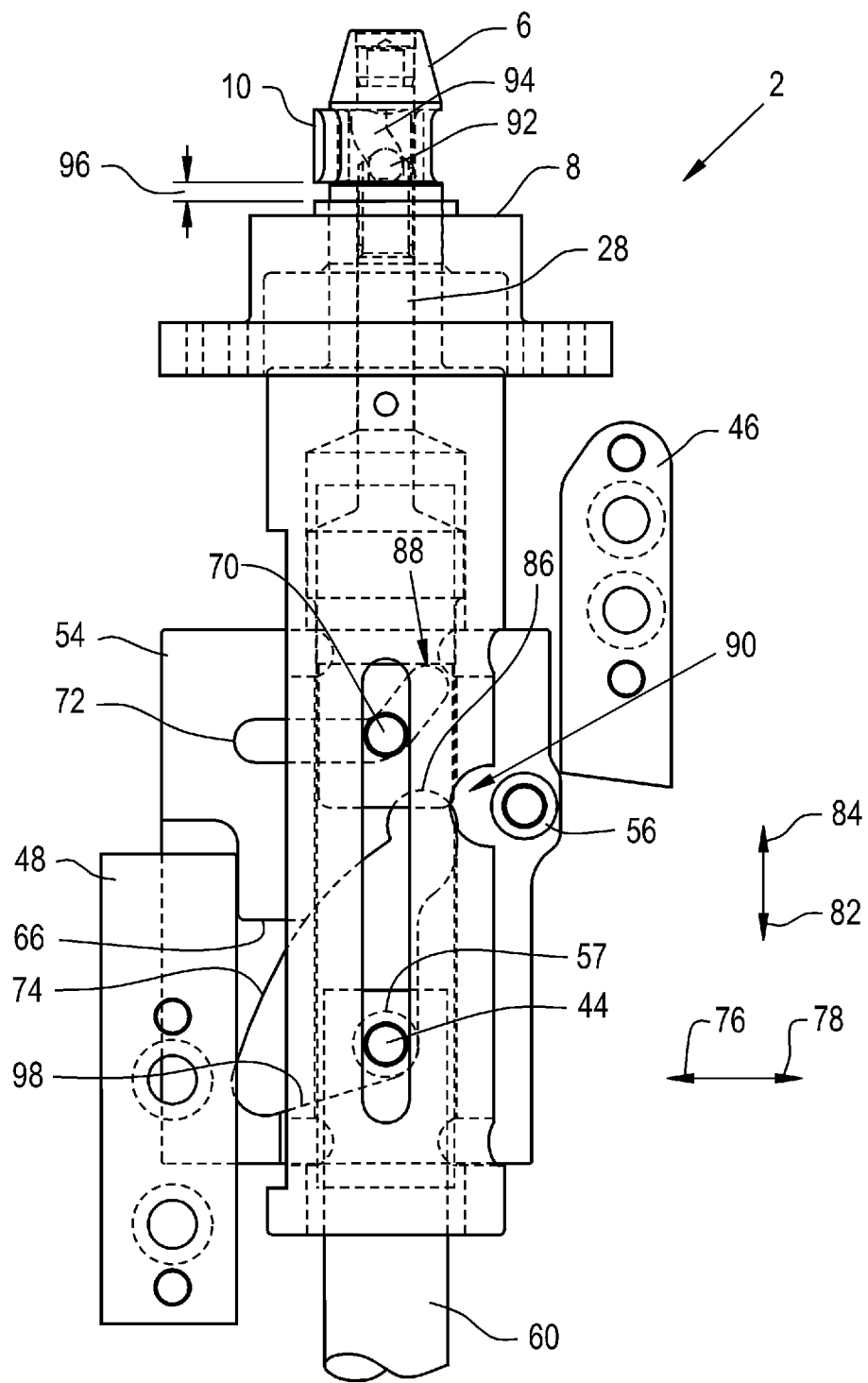

The view of clamp 2 in FIG. 6 shows locating pin 6 moving towards its locking position. In this case, locating pin 6 is moved downward in direction 82 narrowing the gap between collar 8 and finger 10 indicated by spacing 96. As shown in this view, piston rod 60 is pulling sequence cam 54 further downward in direction 82 as well. Also, at least a portion of roller 56 is lower than lock bracket 46. Roller 57 is also approaching cam surface 98 that is part of cam 74.

Figure 7A:
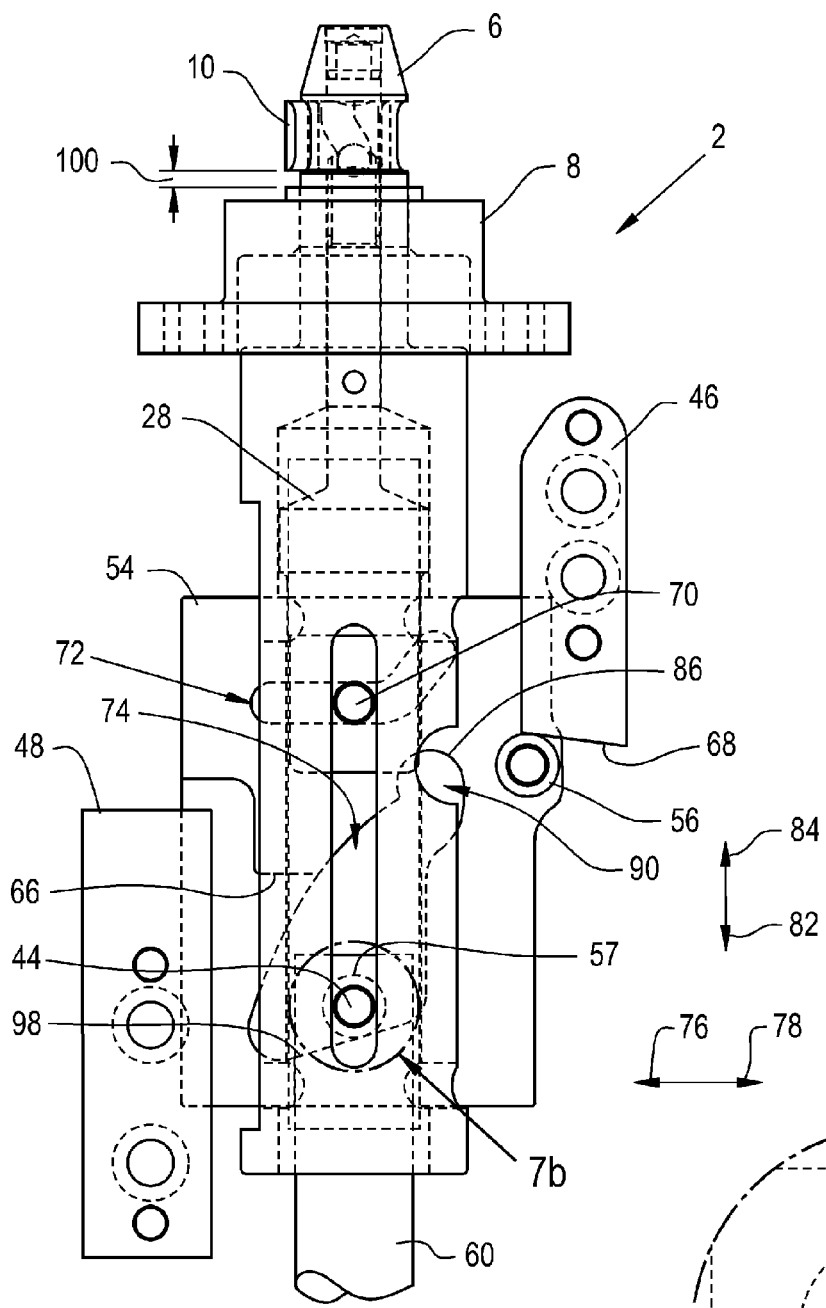

The view in FIG. 7a shows locating pin 6 of clamp 2 moved to its final clamping thickness represented by spacing 100. Illustratively, the spacing maybe 2.5 mm. At this point, a workpiece will be securely held by finger 10 against collar 8. As piston rod 60 moves downward in direction 82, roller 57 moves down angled surface 98 of cam slot 74. This increasing angle forces sequence cam 54 to continue moving in direction 78 and begin wedging roller 56 up against angled surface 68 creating a locking function. At this point, a loss of air pressure to piston rod 60 will not cause finger 10 to release itself from the workpiece. A practical effect of this is that while clamp 2 holds onto the workpiece, its power source may be disconnected allowing clamp 2 and its workpiece to move to a different location. Despite this, clamp 2 still holds the workpiece in place.

Figure 8:
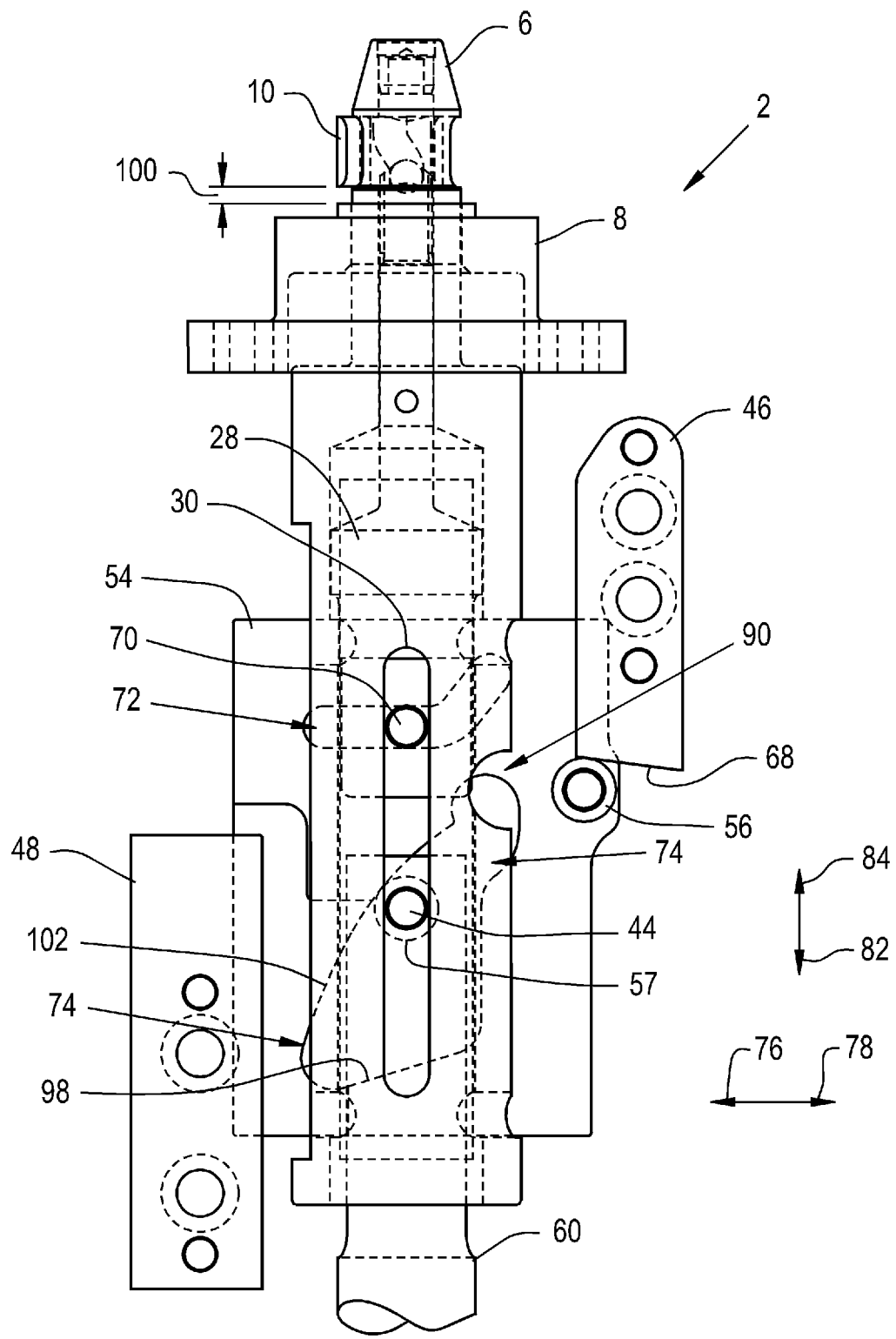
Figure 9:
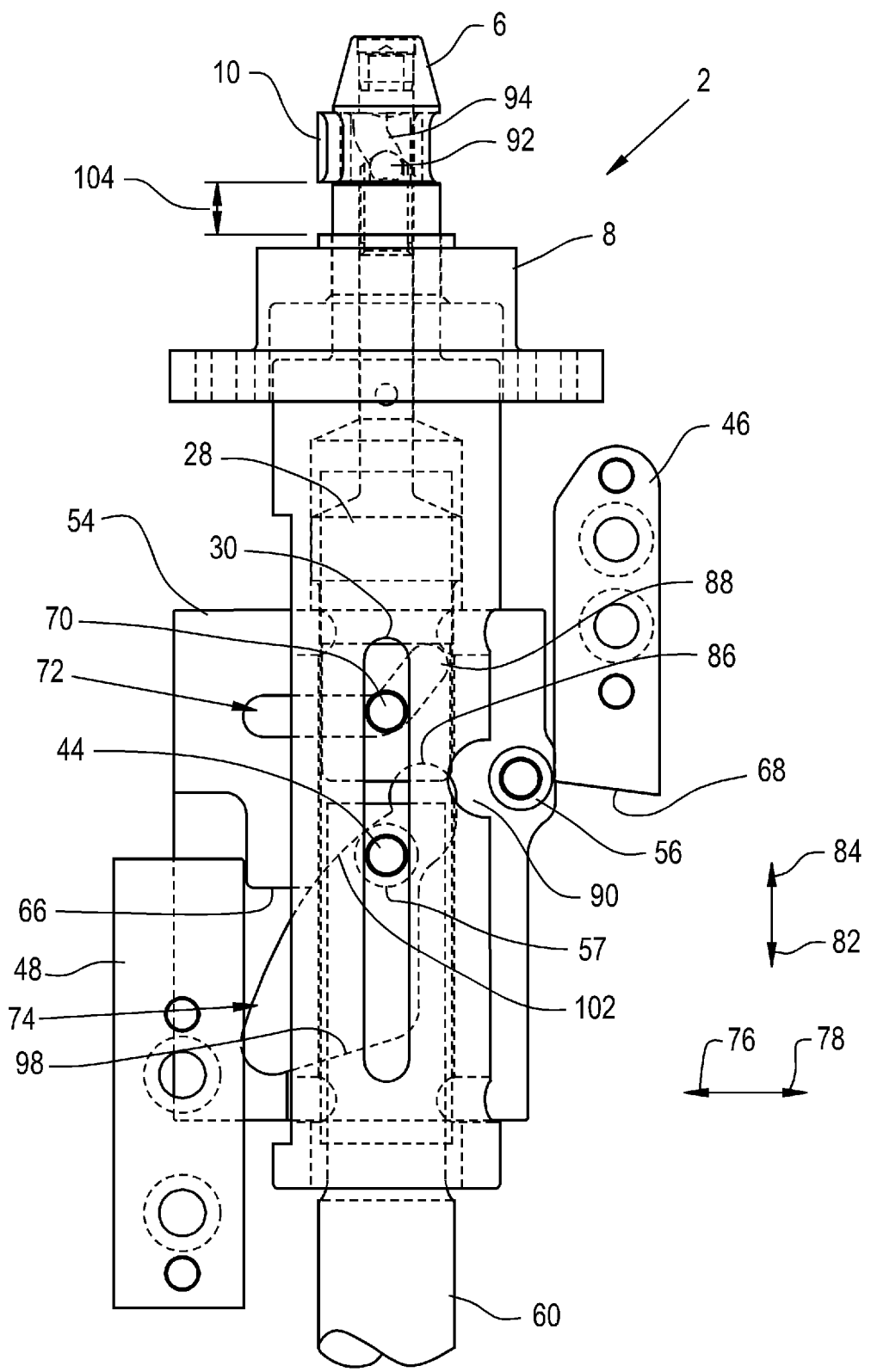

FIGS. 8 and 9 demonstrate the operation of pin clamp 2 to remove the workpiece. It should be appreciate, however, that in the illustrative embodiment, prior to the movement shown in FIGS. 8 and 9, no power is being supplied to clamp 2. Pressurized air is not needed to power actuator 16 until the workpiece is needed to be removed from clamp 2.

Figure 7B:
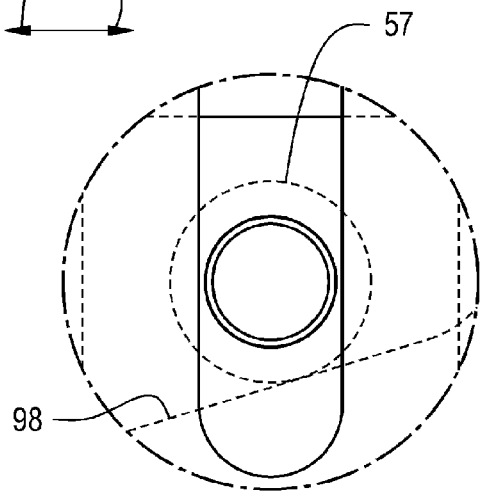

As shown in FIGS. 7, 8, and 9, roller 57 moves within cam slot 74 of sequence cam 54. Cam slot 74 is shaped as such to generate low power when piston rod 60 is moving in direction 82 toward the clamped position, and high power when moving in direction 84 toward the release position. When clamping, roller 57 rides along surface 98 which produces a low force. Roller 56 moving along the illustrative 7 degree angle of surface 68 generates enough additional downward force to allow the necessary structures to move. Conversely, when raising piston rod 60 in direction 84, roller 57 travels along surface 102 which creates a high force to move sequence cam 54 back in direction 76 and help remove roller 56 from under surface 68.

To remove the workpiece, pressurized air is resupplied to clamp 2 moving piston rod 60 in direction 84. This moves roller 57 upwards in direction 84 as well and against cam surface 102 of cam slot 74. This curved shape of surface 102 causes sequence cam 54 to move in the opposite direction 76. This movement of sequence cam 54 begins to extricate roller 57 from surface 68 of lock bracket 46.

The view in FIG. 9 further demonstrates the operation of clamp 2 as piston rod 60 moves in direction 84. As shown, roller 57 continues following surface 102 of slot 74 which continues to move sequence cam 54 in direction 76. Roller 56 clears surface 68 of locking bracket 46 further allowing sequence cam 54 to move in direction 84. This movement also begins to move pin 70 in slot 72 which will (though not yet) move follower 92 in slot 94 to retract finger 10. As shown in this view, however, at this point locating pin 6 is what is being moved by piston rod 60 to raise finger 10 from the workpiece a distance indicated by reference number 104. Continued movement of piston rod 60 in direction 84, moves pin 70 into angled section 88 pushing piston rod 28 upward in direction 84 relative to the locating pin 6. This retracts finger 10 and moves roller 57 up into locking section 86. In other words, clamp 2, as shown in FIG. 9, continues to move as described until the components are in the position as shown in FIG. 4 where the process may start all over again.

Figure 10:
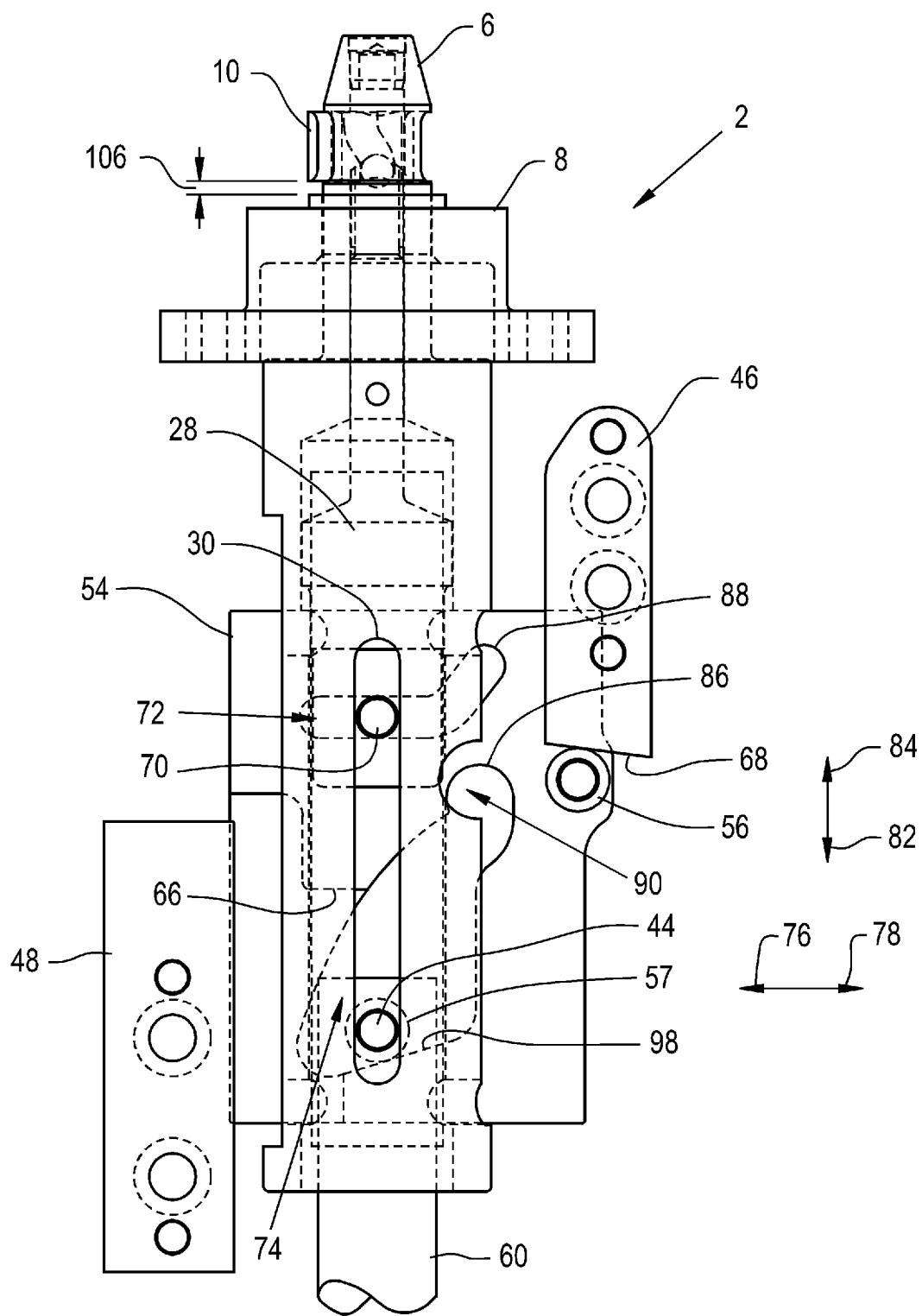
Figure 11:
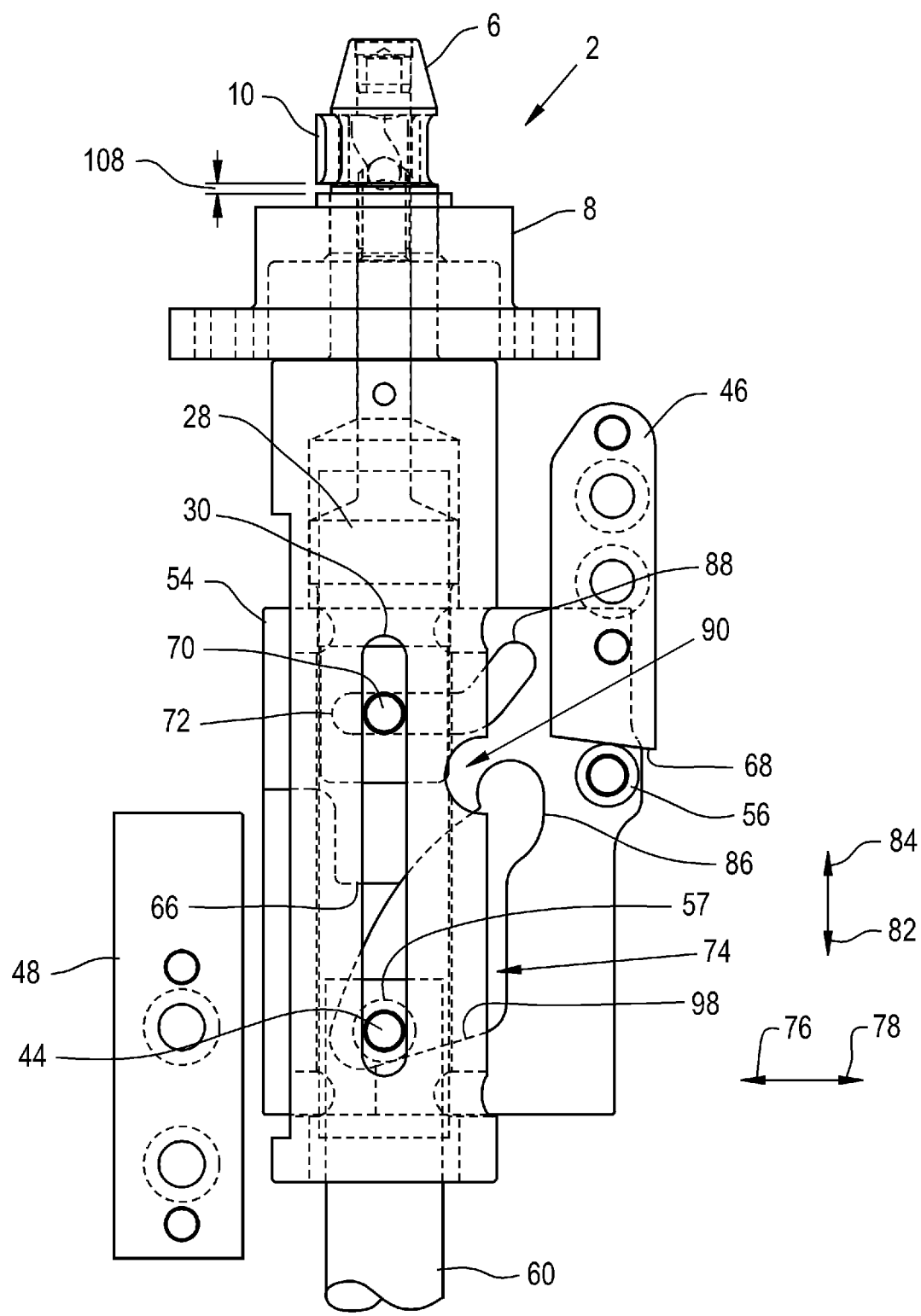
Figure 12:
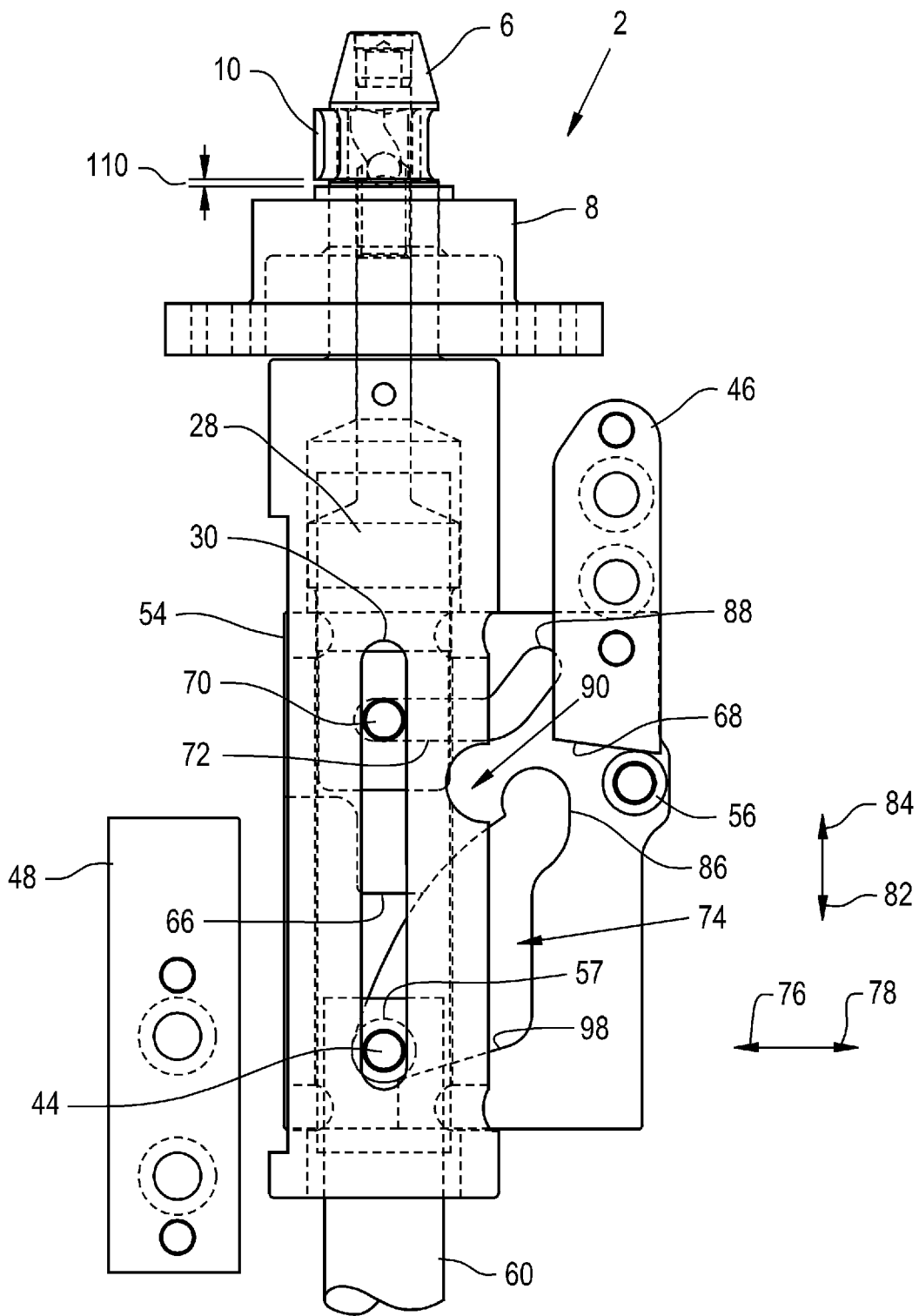

To that end, the view in FIG. 10 depicts clamp 2 clamping down on a workpiece that is thinner than the workpiece clamped down onto in FIGS. 4-7. In this illustrative embodiment, spacing 106 may illustratively be 2 rams instead of 2.5 millimeters, as employed in FIGS. 4-7. In FIG. 10, the sequence of movement is essentially the same as that described in FIGS. 4-7, except now the further clamping distance (for a thinner workpiece) means sequence cam 54 will move even further in direction 78 which makes roller 56 wedge further along surface 68 of lock bracket 46. No other components to clamp 2 need to be manually adjusted to accommodate a thinner workpiece. As shown, locating pin 6 is drawn further down by piston rod 60 in direction 82 moving sequence cam 54 in direction 78 in similar fashion as that described in FIGS. 4-7. The only difference is that the spacing 106 is smaller than spacing 100 in FIG. 7. This moves roller 57 further down cam surface 98 which allows pin 70 to move further along slot 72 and roller 56 further down surface 68 in direction 78. Compare the relative positioning of rollers 56 and surface 68 between FIGS. 7 and 10. This means that when pressurized air is disconnected from clamp 2, finger 10 and locating pin 6 will still hold the thinner workpiece in the same manner as that shown in FIG. 7 for a thicker workpiece. The views in FIGS. 11 and 12 are similar to that of 10 except pin clamp 2 is now clamping onto even thinner workpieces, such as for the spacing shown in 108 of FIGS. 11 and 110 of FIG. 12. It is appreciated that spacing 110 is thinner than spacing 108 which is itself thinner than spacing 106. To accomplish this, sequence cam 54 is simply moved further in direction 78 in both instances to accommodate for these thinner workpieces. Comparing FIGS. 10, 11, and 12, it is easy to see how clamping down on a thin workpiece simply means roller 56 is moved further along surface 68 in direction 78.

Figure 13:
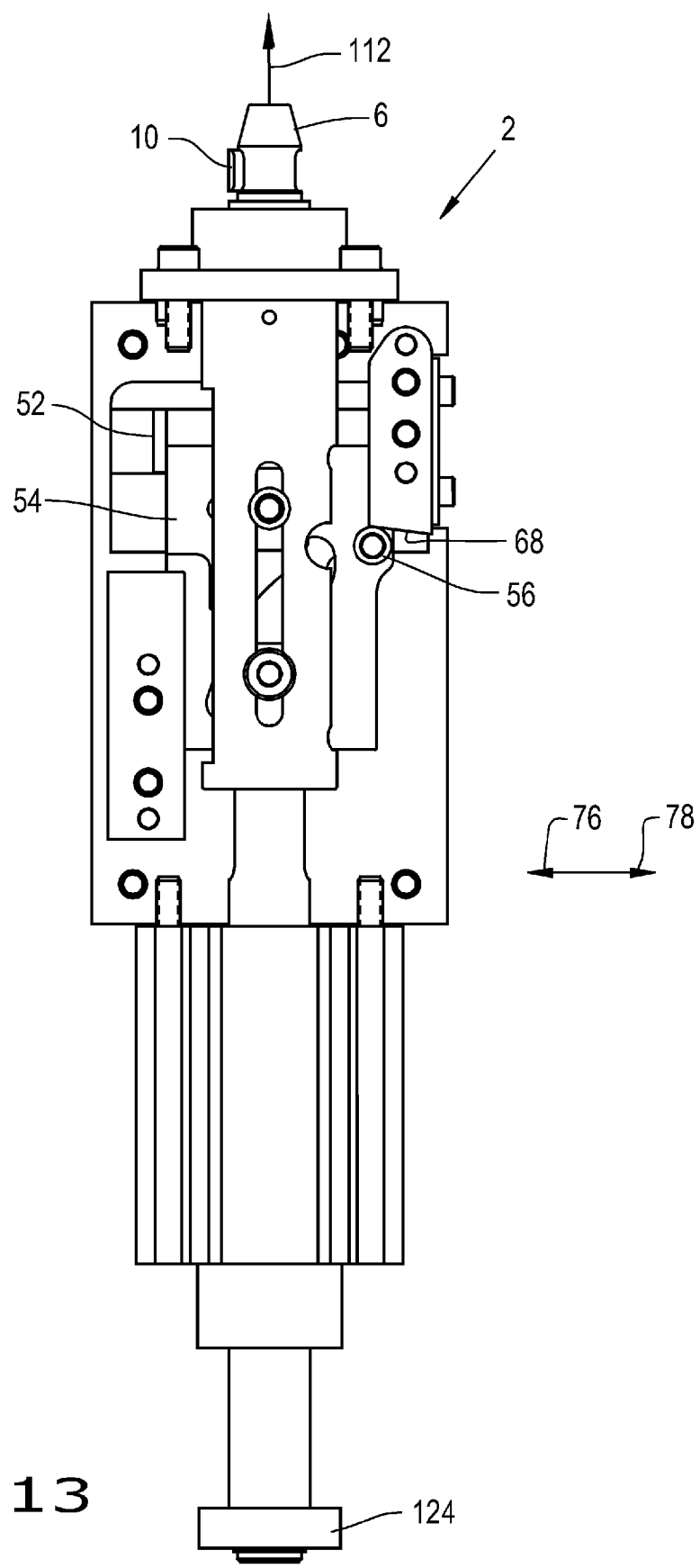
FIGS. 13 and 14 are side views illustrating locking of the pin clamp of the present invention.
Figure 14:
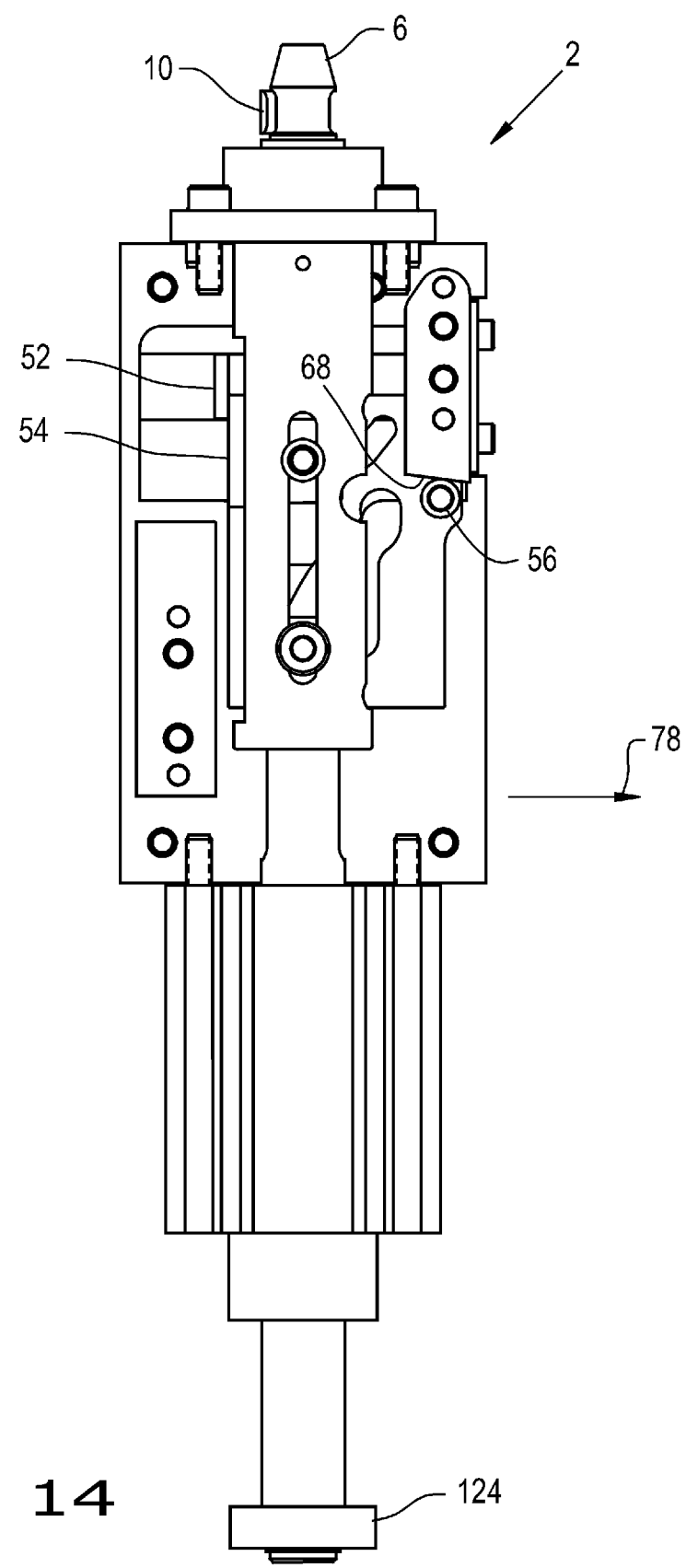

An issue that may occur is slight movement of locating pin 6 while clamped down onto a workpiece. If clamp 2 is locked and air pressure is removed, if an upward force was exerted on pin 6 it could possibly move that pin slightly despite staying locked. A repetitive upward force acting on pin 6 may result in multiple movements of the same which could knock the clamp out of tolerance. For example, if a 500 pound upward force was applied to locating pin 6, it could possibly move despite roller 56 being wedged against surface 68. A welding gun may exert this amount of force or even more onto a pin clamp. It is believed this movement occurs because the components in the clamp stretch just a little bit. Under a 500 pound force, the movement may be only 0.001 inch. But a repetitive force acting on locating pin 6 could multiply that 0.001 distance many times. Under these conditions roller 56 moves a small amount but does not roll back into its original clamp position which may cause a creeping effect which may loosen the clamp's grip on the workpiece. To address this issue, Z-bracket 50 with spring 51 are configured to act on sequence cam 54 to push roller 56 back into position each time it is inadvertently moved. As shown in FIG. 13, when a force 112 acts upward opposite the clamping direction, roller 56 moves with respect to surface 68. Tab 52 acts on sequence cam 54 biasing it in direction 78 to push roller 57 back to its original position, as shown in FIG. 14.

Figure 15:
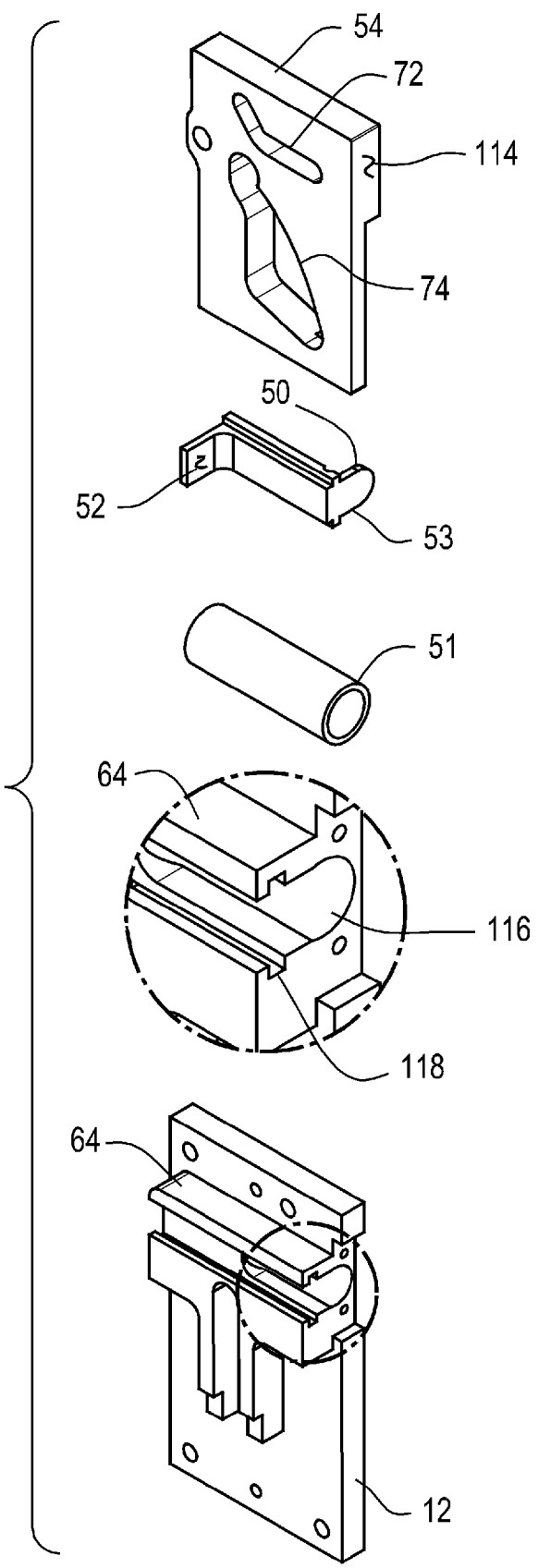
FIG. 15 is an exploded perspective view of a cover, Z bracket and sequence cam.

An exploded view of these components is shown in FIG. 15. Tab 52 of bracket 50 is configured to engage edge 114 of sequence cam 54. (See also FIG. 5.) As spring 51 acts on tab 53, it acts to keep a bias on tab 52 against sequence cam 54. A spring bracket 64 is fitted on cover 12 to receive bracket 50 and spring 51. Illustratively, bracket 64 includes a spring cavity 116 and slot 118 holds spring 51 and bracket 50, respectively.

Figure 16:
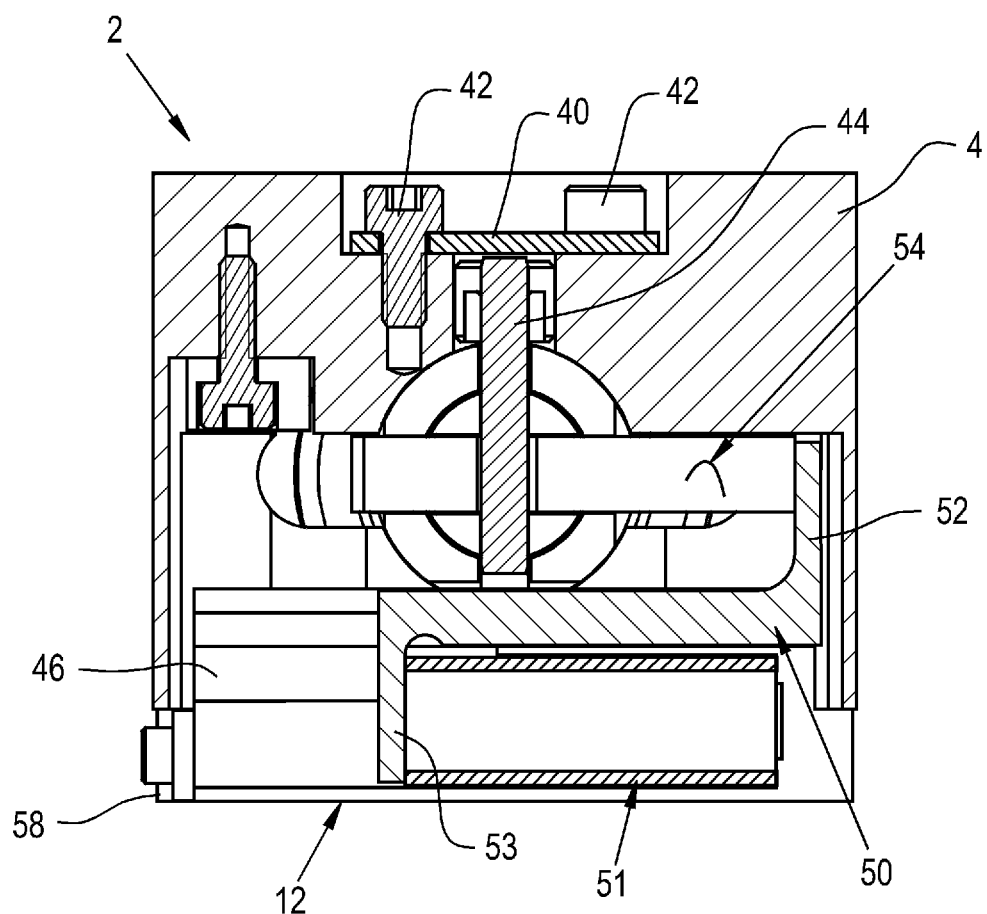
FIG. 16 is a top sectional view showing how the spring loaded Z bracket biases the sequence cam toward the lock bracket.

A top cross-sectional view of clamp 2 is shown in FIG. 16. This view shows the relative positioning of bracket 50, spring 51 and sequence cam 54. As shown, spring 51 biases tab 53 which causes tab 52 to act on sequence cam 54 biasing the same towards lock bracket 46. This helps keep roller 56 properly under lock bracket 46.

Figure 17A:
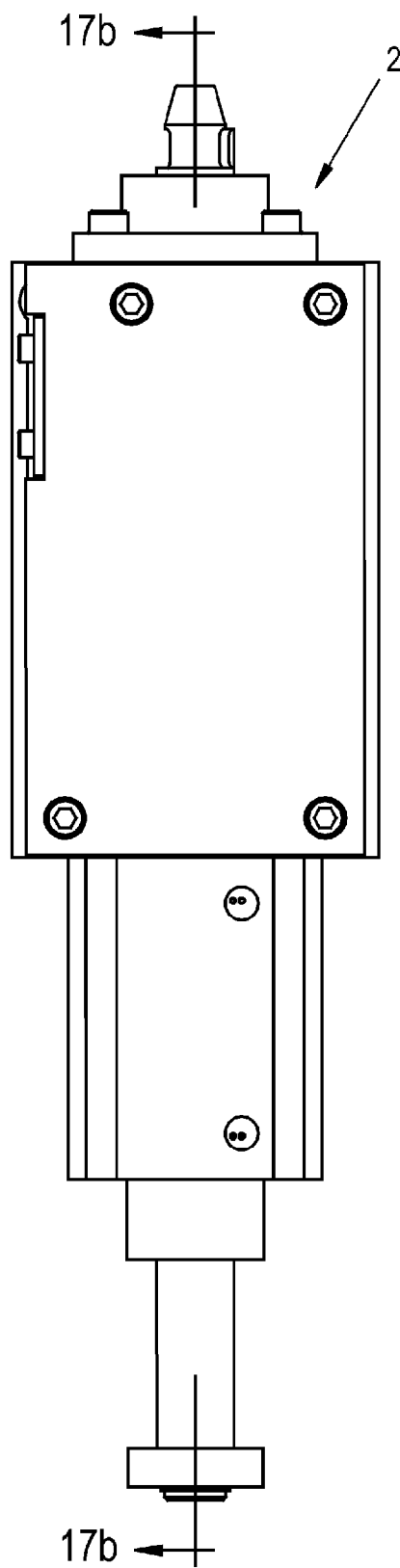
FIGS. 17A and 17B are side and side sectional views, respectively, illustrating details of a linear actuator in the form of a piston and cylinder arrangement.
Figure 17B:
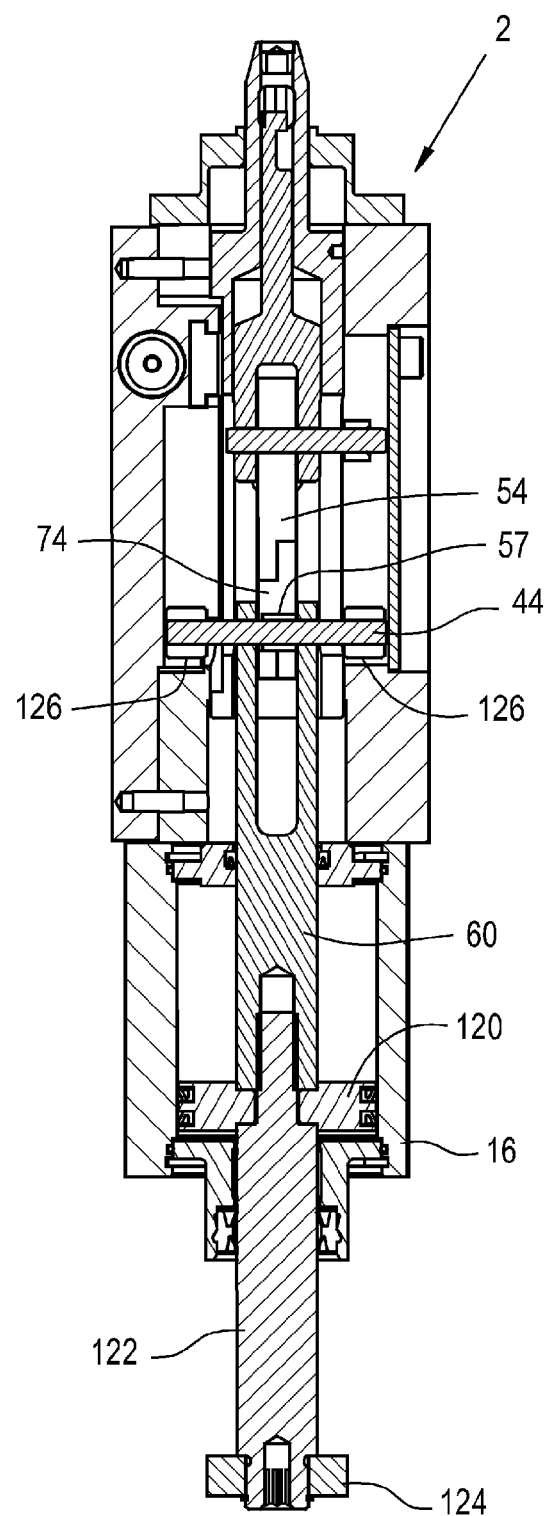

Front elevational and side cross-sectional views of clamp 2 are shown in FIGS. 17a and b. These views, and particularly the cross-sectional view, demonstrate how piston rod 60 is attached to a piston 120 inside actuator 16. Another portion of piston rod 122 extends from piston 120 partially exterior of actuator 16 and includes a nut 124 attached to the end thereof. Illustratively, nut 124 may be a target for a proximity switch to detect when the clamp is closed. The surface of 124 may be reflective so that when a beam of light hits it when in a certain location, the switch knows the clamp has achieved a certain condition (such as closed). The upper portion of piston rod 60 is coupled to sequence cam 54 via rod 44. In this illustrative embodiment, roller 57 is shown within cam slot 74. Illustratively, additional rollers 126 also support rod 44. Roller 57 is configured to transmit force while rollers 126 carry side load forces generated by cam slot 74. This has the affect of keeping the piston rod 60 centered.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pin clamp for clamping a workpiece, said pin clamp comprising:
    a housing;
    a locating pin extending through said housing and having a longitudinal axis, said locating pin being sized to be positioned within an opening of the workpiece;
    a finger positioned adjacent to said locating pin and movable in a transverse direction relative to said longitudinal axis to retain the workpiece on the locating pin;
    a linear actuator coaxial with said longitudinal axis and configured to move said locating pin in opposite directions along said longitudinal axis;
    a locking arrangement attached to said housing; and
    a sequence cam connected with said linear actuator in a manner allowing axial movement of said linear actuator to be converted into transverse movement of said sequence cam perpendicular to said longitudinal axis, said sequence cam including an engagement surface which engages said locking arrangement to lock said locating pin and said finger against the workpiece upon retraction of said linear actuator, wherein:
        said sequence cam includes an internal cam surface formed therein, and further including a rod coupled with said linear actuator and a cam follower associated with said rod, said cam follower positioned within said internal cam surface and interconnecting said linear actuator with said sequence cam, said cam follower engaging said internal cam surface and moving said sequence cam in said transverse directions upon movement of said linear actuator, wherein:
        said cam follower is a cam roller, and wherein:
        said internal cam surface has a generally triangular shape with a linear lock portion extending from said triangular shape toward said locating pin, and wherein said cam roller is positionable within said lock portion and said internal cam surface includes a detent which locks under said cam roller and locks said locating pin in position.

2. A pin clamp for clamping a workpiece, said pin clamp comprising:
    a housing;
    a locating pin extending through said housing and having a longitudinal axis, said locating pin being sized to be positioned within an opening of the workpiece;
    a finger positioned adjacent to said locating pin and movable in a transverse direction relative to said longitudinal axis to retain the workpiece on the locating pin;
    a linear actuator coaxial with said longitudinal axis and configured to move said locating pin in opposite directions along said longitudinal axis;
    a locking arrangement attached to said housing; and
    a sequence cam connected with said linear actuator in a manner allowing axial movement of said linear actuator to be converted into transverse movement of said sequence cam perpendicular to said longitudinal axis, said sequence cam including an engagement surface which engages said locking arrangement to lock said locating pin and said finger against the workpiece upon retraction of said linear actuator, wherein:
        said sequence cam includes an internal cam surface formed therein, and further including a rod coupled with said linear actuator and a cam follower associated with said rod, said cam follower positioned within said internal cam surface and interconnecting said linear actuator with said sequence cam, said cam follower engaging said internal cam surface and moving said sequence cam in said transverse directions upon movement of said linear actuator,
        further including a spring loaded Z bracket which engages said sequence cam and biases said sequence cam toward said locking arrangement.

3. The pin clamp of claim 1, wherein said sequence cam locks said locating pin and said finger against the workpiece upon and after removal of power from said linear actuator.

4. The pin clamp of claim 3, wherein said pin clamp is configured to clamp onto different workpieces having a different thickness.

5. The pin clamp of claim 3, wherein said linear actuator is a fluid actuated linear actuator, and wherein said sequence cam locks said locating pin and said finger against the workpiece upon removal of fluid power from said linear actuator.

6. The pin clamp of claim 1, wherein said linear actuator includes a fluid actuated piston and cylinder arrangement with a piston slidably movable within a cylinder, and a piston rod coupled with said piston, and wherein said sequence cam is movable in opposite transverse directions generally perpendicular to said longitudinal axis, and wherein said sequence cam includes a roller defining said engagement surface, and wherein said locking arrangement includes an angled surface positioned at an acute angle of between approximately 0° to 10° relative to said transverse directions of movement of said sequence cam, and wherein said roller locks under said angled surface.

7. The pin clamp of claim 2, wherein said sequence cam locks said locating pin and said finger against the workpiece upon and after removal of power from said linear actuator.

8. The pin clamp of claim 7, wherein said pin clamp is configured to clamp onto different workpieces having a different thickness.

9. The pin clamp of claim 7, wherein said linear actuator is a fluid actuated linear actuator, and wherein said sequence cam locks said locating pin and said finger against the workpiece upon removal of fluid power from said linear actuator.

10. The pin clamp of claim 2, wherein said linear actuator includes a fluid actuated piston and cylinder arrangement with a piston slidably movable within a cylinder, and a piston rod coupled with said piston, and wherein said sequence cam is movable in opposite transverse directions generally perpendicular to said longitudinal axis, and wherein said sequence cam includes a roller defining said engagement surface, and wherein said locking arrangement includes an angled surface positioned at an acute angle of between approximately 0° to 10° relative to said transverse directions of movement of said sequence cam, and wherein said roller locks under said angled surface.

* * * * *